April 23, 1957  H. KONET ET AL  2,790,119
SERVOSYSTEM STABILIZED PLATFORM
Filed Jan. 19, 1950  3 Sheets-Sheet 1
FIG. 1
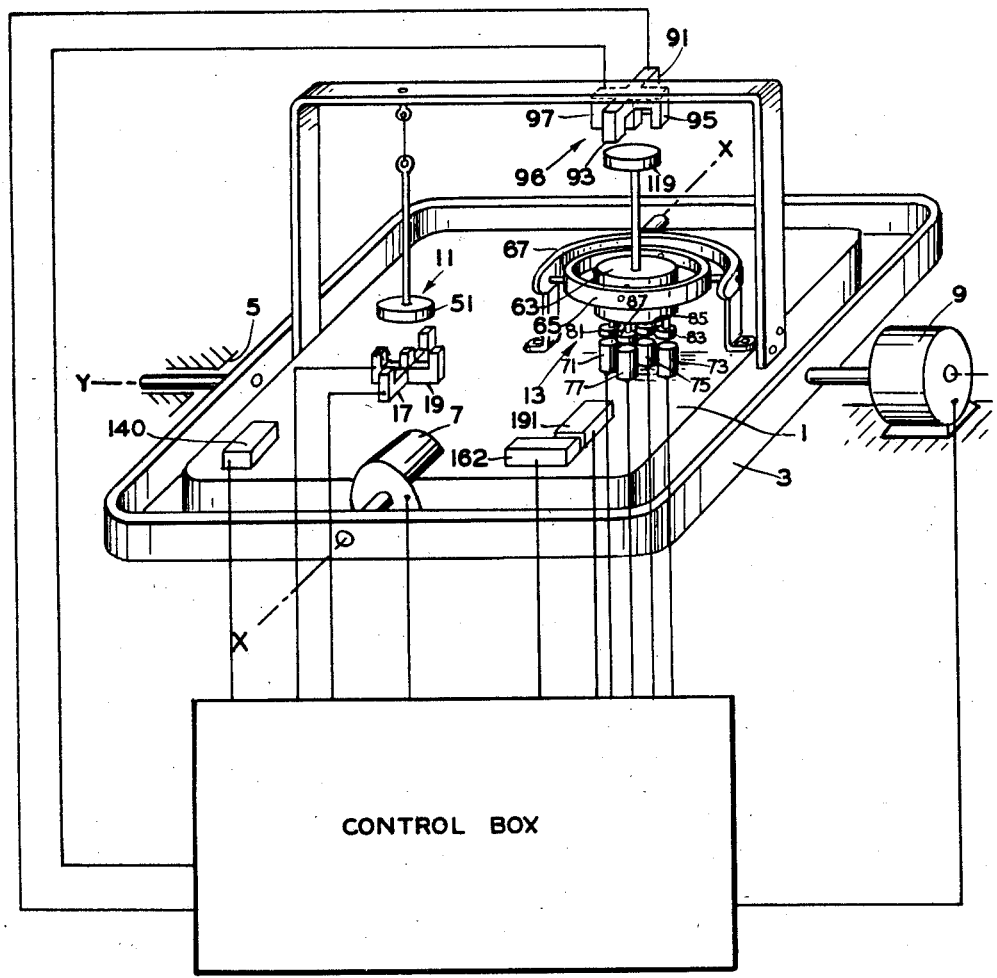
CONTROL BOX
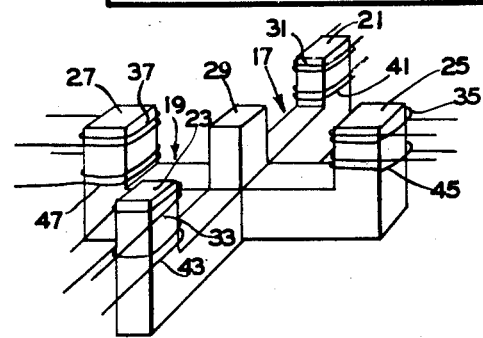
FIG. 4
INVENTORS
HENRY KONET
LANDON W. L. EDMONDS
BY
ATTORNEY April 23, 1957  H. KONET ET AL  2,790,119
SERVOSYSTEM STABILIZED PLATFORM
Filed Jan. 19, 1950  3 Sheets-Sheet 2
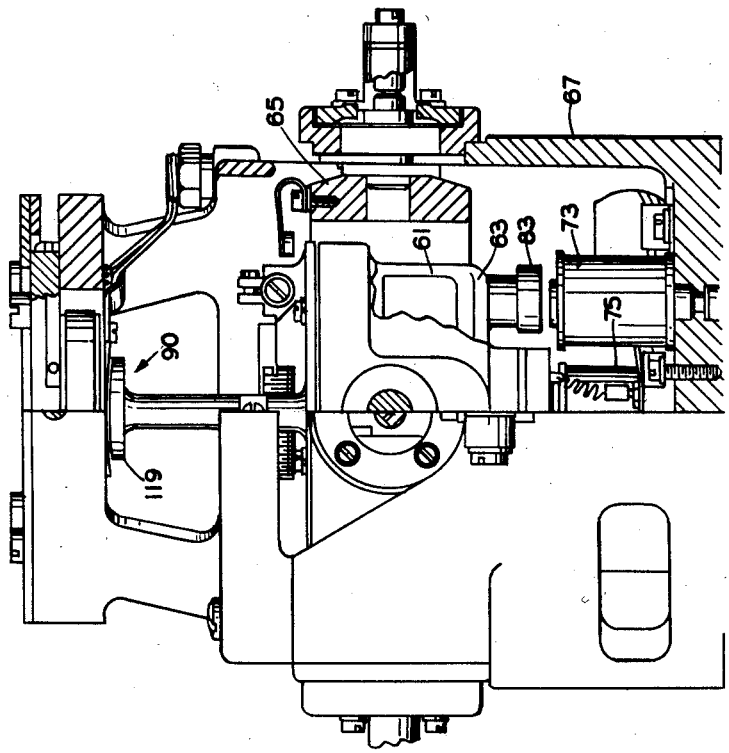
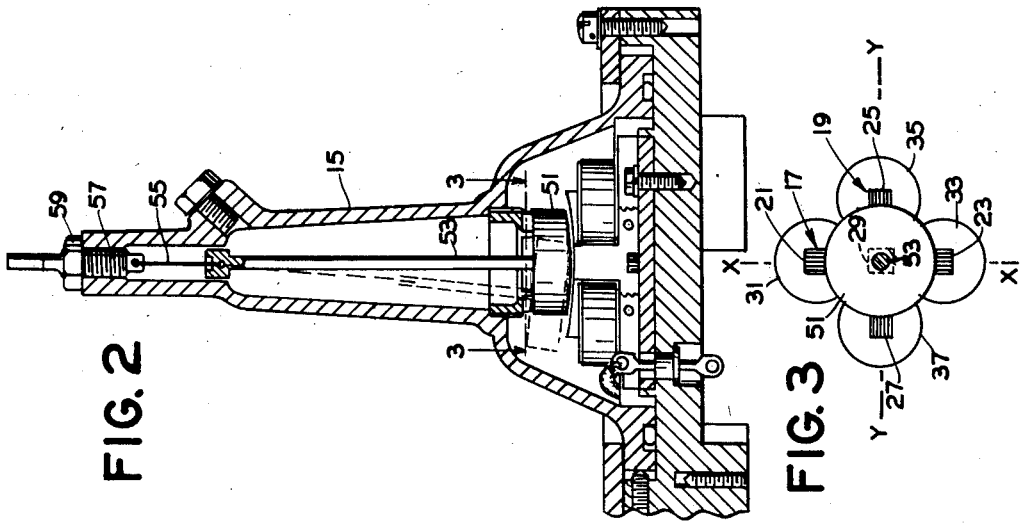
INVENTORS
HENRY KONET
LANDON W. L. EDMONDS
ATTORNEY April 23, 1957 H. KONET ET AL 2,790,119
SERVOSYSTEM STABILIZED PLATFORM Filed Jan. 19, 1950 3 Sheets-Sheet 3

INVENTORS
HENRY KONET
LANDON W. L. EDMONDS
BY
ATTORNEY

United States Patent Office 2,790,119
Patented Apr. 23, 1957

2,790,119
SERVOSYSTEM STABILIZED PLATFORM

Henry Konet, Hohokus, N. J., and Landon W. L. Edmonds, Blue Point, N. Y., assignors to Bendix Aviation Corporation, Teterboro, N. J., a corporation of Delaware Application January 19, 1950, Serial No. 139,525

11 Claims. (Cl. 318—19)

The invention relates to stabilized platforms for use on aircraft, ships or other vehicles and for mounting navigation instruments, guns or other devices.

Platforms used heretofore are stable to approximately only fifteen minutes of the horizontal, whereas the novel system of the present invention provides for stabilizing platforms to approximately one minute of the horizontal.

One object of the present invention is to provide a novel stabilizing system for accurately maintaining a platform in a predetermined attitude.

Another object is to provide a novel vertical detector which is highly sensitive.

Another object is to integrate the signals from the vertical detector by a gyroscope or other suitable device.

The invention contemplates a platform which may be mounted on a vehicle and is rotatable about mutually perpendicular axes. A vertical detector and a gyroscope are mounted on the platform. When the platform departs from the horizontal or other predetermined attitude, pick-off means on the gyroscope provide signals corresponding to the angles of departure of the platform from the predetermined attitude about the mutually perpendicular axes. The signals are supplied to a servo system for rotating the platform about the mutually perpendicular axes back to the horizontal and the pick-off means is returned to null position. The spin axis of the gyroscope is maintained in a suitable attitude relative to the platform by a precessing means responsive to the vertical detector.

The novel vertical detector constructed according to the invention may include a core having a plurality of mutually spaced poles with pairs of poles opposing one another. Exciting coils produce flux in the poles, and output coils on the poles are connected so that voltages induced in the coils on opposite poles oppose one another. A member is pendulously supported by a wire-like element for movement relative to the core and the phases of the output voltages from pairs of opposing coils is determined by the relative position of the member and core.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

In the drawings, Figure 1 is a schematic diagram showing a platform stabilized by a novel system constructed according to the invention.

Figure 2 is a transverse vertical section of the novel vertical detector used in the stabilizing system.

Figure 3 is a horizontal section taken approximately on the line 3—3 of Figure 2.

Figure 4 is a perspective view of the pole piece and associated coils of the vertical detector.

Figure 5 is in part a transverse vertical section, and in part a side view of the gyroscope used in the stabilizing system.

Figure 6:
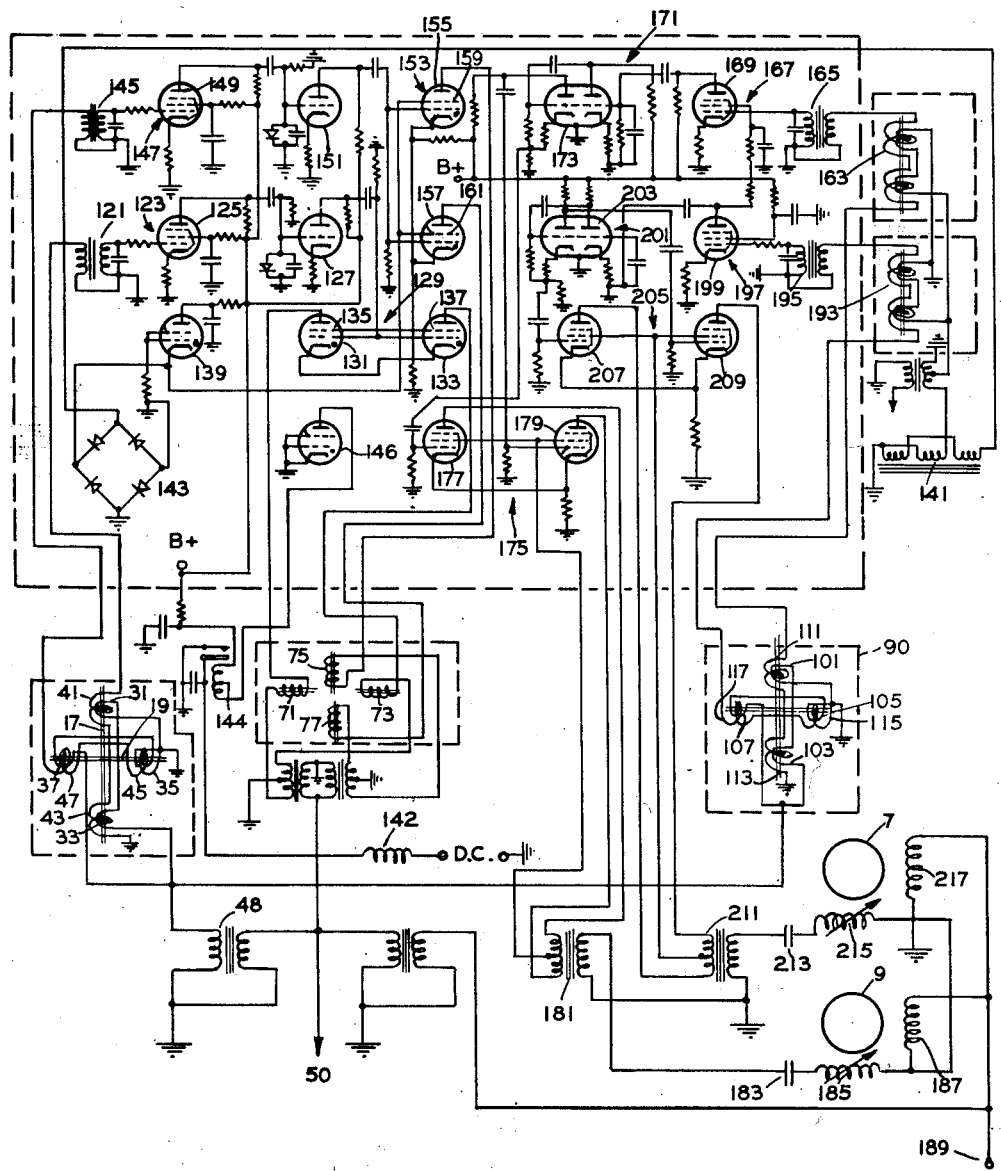
Figure 6 is a wiring diagram showing the electrical connections in the system.

Referring now to the drawings for a more detailed description of the novel stabilizing system of the present invention, a platform 1 is shown in Figure 1 as supported by a gimbal 3 in a fixed frame 5 for rotation about mutually perpendicular horizontal axes X and Y. The platform is rotated about the X axis relative to gimbal 3 by a servo motor 7, and the platform and gimbal are rotated about the Y axis by a servo motor 9.

A vertical detector 11 and a gyroscope 13 are mounted on the platform and cooperate to control servo motors 7 and 9 to maintain the platform horizontal.

As shown in Figures 2, 3 and 4, vertical detector 11 includes a substantially bell-shaped housing 15 mounting a stator comprising a pair of substantially E-shaped laminated transformer cores 17, 19 at right angles to one another and providing four outer poles 21, 23, 25, 27 and a central pole 29. Core 17 preferably extends parallel to the X axis, and core 19 preferably extends parallel to the Y axis. On outer poles 21, 23, 25, 27 are wound exciting coils 31, 33, 35, 37 (Figure 4) and output windings 41, 43, 45, 47, respectively (Figures 4 and 6).

The exciting coils 31, 33 and exciting coils 35, 37 are connected in pairs in series through a transformer 48 to a suitable alternating power source 50. The output windings 41, 43 on oppositely disposed poles 21, 23 are connected in series opposition, and output windings 45, 47 on oppositely disposed poles 25, 27 are connected in series opposition. A pendulous member includes an armature 51 (Figure 2) rigid with a shaft 53 and suspended by a wire 55 attached to an adjusting screw 57 threaded into the upper end of housing 15 and maintained in adjusted position by a lock nut 59. The associated surfaces of the poles and armature are ground to identical radii and screw 57 is adjusted so that the pendulous member swings freely from a point spaced a substantial distance from the cores and the air gap between the armature and poles is a minimum.

When the armature is centered above the stator, as shown in Figure 3 and in solid lines in Figure 2, the flux paths through opposing poles and armature are equal and the voltages in each pair of output coils are equal and opposite, thereby canceling one another and producing a null signal. Displacement of the amature substantially parallel to the plane of the cores from its centered position above the stator, as shown in broken lines in Figure 2, provides unequal fluxpaths through opposing coils and the armature. The resulting signal is proportional in magnitude to the displacement of the armature from its centered position. The phase of the signal is determined by the direction of displacement of the armature.

The gyroscope (Figures 1 and 5) includes a rotor 61 rotatably supported by a case 63. A gimbal 65 supports the rotor case for rotation about an axis parallel to the Y axis and is rotatably supported by a housing 67, rigid with the platform, for rotation about an axis parallel to the X axis. The gyroscope spin axis is precessed to any suitable attitude by four precessing electromagnets 71, 73, 75, 77 on housing 67 and cooperating with four associated armatures 81, 83, 85, 87 on case 63.

The gyroscope is provided with a pick-off 90 to indicate the relative movement between the spin axis and the gyroscope housing to provide signals proportional to the tilt of the platform from the horizontal. Pick-off 90 has a stator including oppositely disposed poles 91, 93, 95, 97 provided with exciting windings 101, 103, 105, 107 and output windings 111, 113, 115, 117 (see Figure 6). The stator corresponds generally to the stator of vertical pendulum 11. An armature 119 (Figures 1 and 5) of pick-off 90 is secured to the rotor casing and corresponds generally to armature 51 of the vertical detector.

The output of opposing coils 41, 43 of vertical detector 11 (Figure 6) is fed through a transformer 121 to a voltage amplifier 123 including a pentode 125. A voltage limiter 127 receives the output of voltage amplifier 123 and limits the amplitude of the output to a predetermined maximum. A phase discriminator 129 including a pair of thyratrons 131, 133, determines the phase of the voltage from voltage limiter 127. The output of thyratron 131 is fed to precessing coil 71, and the output of thyratron 133 is fed to precessing coil 73. One or the other of precessing coils 71, 73 is energized as determined by the phase of the signal and precesses the gyroscope about the X axis.

A pulsing voltage is continuously applied to the screen grids 135, 137 of thyratrons 131, 133 by an oscillator or pulse generator 139 to periodically interrupt the output of the phase discriminator so that a pulsing torque is exerted by coils 71, 73.

A free gyroscope 140 (Figure 1) is positioned on the platform with its spin axis parallel to the fore and aft axis of the craft and parallel to the X axis of the platform. The free gyroscope is caged approximately sixty times a minute by a caging mechanism (not shown). The caging mechanism is periodically actuated by a solenoid 142 (Figure 6) energized through a relay 144 connected to and periodically pulsed by an oscillator 146. Free gyroscope 140 has a pick-off 141 which produces an interrupted A. C. voltage when the craft turns. The voltage is rectified by a rectifier circuit 143 connected to oscillator 139. The rectified voltage provides a cut-off bias for the oscillator and reduces the pulse frequency for thyratrons 131, 133 and 155, 177, so that the precessing rate of the gyroscope is decreased materially when the craft turns.

The output of opposing coils 45, 47 of vertical detector 11 is fed through a transformer 145 to a voltage amplifier 147 including a pentode 149. A voltage limiter 151 receives the output of voltage amplifier 149 and limits the amplitude of the output to a predetermined maximum. A phase discriminator 153, including a pair of thyratrons 155, 157, determines the phase of the voltage from voltage limiter 151. The output of thyratron 155 is fed to precessing coil 75, and the output of thyratron 157 is fed to precessing coil 77. One or the other of precessing coils 75, 77 is energized as determined by the phase of the signal and precesses the gyroscope about the Y axis.

A pulsing voltage is continuously applied to the screen grids 159, 161 of thyratrons 155, 157 by oscillator 139 to periodically interrupt the output of the phase discriminator so that a pulsing torque is exerted by coils 75, 77 to precess the gyroscope and the pulse frequency is reduced when the craft turns, as described above.

Output windings 111, 113 on the gyroscope generate a signal when the platform departs from the horizontal about the Y axis. An angular rate generator 162 (Figure 1) is mounted on the platform with its spin axis extending parallel to the Y axis and has a pick-off winding 163 (Figure 6) connected in series with output windings 111, 113. Pick-off winding 163 receives the signal from output windings 111, 113 and produces a voltage in phase opposition with the signal to damp movement of the platform and prevent over-riding of the platform as it is returned to horizontal position by motor 9. The output from the rate generator is fed through a transformer 165 to a voltage amplifier 167 including a pentode 169. The amplified voltage is fed to a phase inverter 171 including a dual triode 173. The output of the phase inverter is impressed on a power amplifier 175 including a pair of pentodes 177, 179 connected in push-pull fashion. The output of amplifier 175 is impressed through an output transformer 181 and a phasing condenser 183 on the variable phase 185 of reversible two-phase motor 9. The fixed phase 187 of the motor may be excited from an alternating current source 189. Motor 9 drives platform 1 to horizontal position about the Y axis, as determined by the phase of the signal from output windings 111, 113.

Output windings 115, 117 on the gyroscope generate a signal when the platform departs from the horizontal about the X axis. An angular rate generator 191 (Figure 1) is mounted on the platform with its spin axis extending parallel to the X axis, and has a pick-off winding 193 (Figure 6) connected in series with output windings 115, 117. Pick-off winding 193 receives the signal from output windings 115, 117 and produces a voltage in phase opposition with the signal to damp movement of the platform and prevent over-riding of the platform as it is returned to horizontal position by motor 7. The output from the rate generator is fed through transformer 195 to a voltage amplifier 197 including a pentode 199. The amplified voltage is fed to a phase inverter 201 including a dual triode 203. The output of the phase inverter is impressed on a power amplifier 205 including a pair of pentodes 207, 209 connected in push-pull fashion. The output of amplifier 205 is impressed through an output transformer 211 and a phasing condenser 213 on the variable phase 215 of reversible two-phase motor 7. The fixed phase 217 of the motor may be excited from alternating current source 189. Motor 7 drives platform 1 to horizontal position about the X axis, as determined by the phase of the signal from output windings 115, 117.

Should the platform depart from a horizontal position, the vertical detector provides signals to the gyroscope precessing coils so that the gyroscope spin axis follows the vertical detector. The gyroscope pick-off produces signals and the servo system causes the platform to follow the gyroscope and maintains the platform in coincidence with the gyroscope and restores the vertical detector to its null position. The platform follows the gyroscope rapidly, but the gyroscope precesses more slowly and integrates the data furnished to it by the vertical detector.

The platform and structure supported thereby preferably is balanced statically and dynamically to obtain maximum accuracy.

The arrangement described provides for maintaining the platform within an accuracy of approximately one minute to the horizontal, as determined by the vertical detector. The vertical detector used in the system is accurate to within twenty seconds of the vertical and provides an accuracy seldom attained by such devices heretofore.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a system for maintaining a platform in a predetermined attitude, means mounting said platform for rotation about mutually perpendicular axes, motor means drivably connected to said platform for rotating said platform about said axes, a vertical detector and a gyroscope mounted on said platform, said vertical detector including means for providing signals when said platform departs from its predetermined attitude, means for precessing the gyroscope in response to said signals and integrating the signals, means for providing signals corresponding to the rate of angular movement of said platform about said axes, and means for combining the integrated signals and rate signals to control said motor means.

2. In a system for maintaining a platform in a predetermined attitude, means mounting said platform for rotation about mutually perpendicular axes, motor means drivably connected to said platform for rotating said platform about said axes, a vertical detector mounted on said platform and including means for providing signals when said platform departs from its predetermined attitude, a gyroscope mounted on said platform, means for precessing the gyroscope in response to said signals to maintain the gyroscope spin axis in a predetermined attitude and to integrate said signals, pick-off means responsive to relative movement between the gyroscope spin axis and said platform, means for providing signals corresponding to the rate of angular movement of said platform about said axis, and means for combining the integrated signals and rate signals to control said motor means.

3. In a system of the kind described, a platform to be maintained horizontal, means mounting said platform for rotation about mutually perpendicular axes, motor means drivably connected to said platform and rotating said platform about said axes, a vertical detector mounted on said platform and providing signals in response to departure of said platform from the horizontal about said axes, a gyroscope mounted on said platform and having means receiving the signals from said detector and precessing the gyroscope so that the spin axis of the gyroscope follows movement of said detector about said axes, means associated with said gyroscope and detecting relative movement of the gyroscope spin axis and platform and providing integrated signals corresponding thereto, and means for providing signals corresponding to the rate of angular movement of said platform about said mutually perpendicular axes, said integrated signals and said rate signals being combined algebraically to control said motor means.

4. In a system for maintaining a platform horizontal, means mounting said platform for rotation about mutually perpendicular horizontal axes, a reversible motor for rotating said platform about one of said axes, a second reversible motor for rotating said platform about the other of said axes, a vertical detector and a gyroscope mounted on said platform, said vertical detector providing a signal when the platform departs from the horizontal about each of said axes, means to discriminate the phase of each of the signals, means responsive to the discriminated signal for precessing said gyroscope, a pick-off providing an integrated signal in response to relative movement of said platform and the spin axis of the gyroscope about each of said axes, an angular rate generator having its spin axis disposed parallel to one of said axes and being connected to said pick-off corresponding to said other axis, and an angular rate generator having its spin axis disposed parallel to the last mentioned axis and being connected to said pick-off corresponding to said first mentioned axis, said rate generators producing voltages out of phase with the integrated signals in response to rotation of the platform about said axes to damp movement of said platform, and said motors being responsive to the algebraic sum of the integrated signals and outputs of said rate generators.

5. In a system for maintaining horizontal a platform mounted in a moving craft and rotatable relative to the craft about mutually perpendicular horizontal axes, a reversible motor rotating said platform about one of said axes, a second reversible motor for rotating said platform about the other of said axes, a vertical detector and a gyroscope mounted on said platform, said vertical detector providing a signal when the platform departs from the horizontal about each of said axes, a phase discriminator to discriminate the phase of each of the signals, means to provide a pulsating voltage to periodically interrupt the outputs of said phase discriminators, means responsive to the outputs of said phase discriminators and exerting pulsed precessing torques on the gyroscope about said axes, means to reduce the pulse frequency when the craft turns to provide a slower precessing rate for the gyroscope, and a pick-off providing an integrated signal in response to relative movement of said platform and the spin axis of the gyroscope about each of said axes, said motors being responsive to the output of said pick-off.

6. In a system for maintaining a platform in a predetermined attitude, means mounting said platform for movement about mutually perpendicular axes, driving means for rotating said platform about said axes, a vertical detector mounted on said platform and having a core with four mutually spaced poles and with pairs of poles opposing one another and with the axes of said pairs positioned parallel to said mutually perpendicular axes, means to excite said poles, an output coil on each of said poles, a member pendulously supported by a substantially frictionless support for movement relative to said core and substantially parallel to the plane of said core, the output of said coils being determined by the relative position of said member and core, a gyroscope mounted on said platform and including a rotor spinning about an axis having a predetermined attitude, a precessing means for maintaining said spin axis in said predetermined attitude and responsive to the output of said vertical detector, and pick-off means on said gyroscope for detecting movement of the spin axis relative to the platform, the signals from said pick-off means controlling said driving means, said pick-off means comprising two circuits each including a pair of opposed magnetic poles, said poles being supported by the platform and arranged symmetrically about an axis, and an armature fixed to the gyroscope and located on said axis equidistant from and adjacent to said poles when the spin axis of the gyroscope is in normal position.

7. In a system for maintaining horizontal a platform mounted in a moving craft and rotatable relative to the craft about mutually perpendicular horizontal axes, a reversible motor for rotating said platform about one of said axes, a second reversible motor for rotating said platform about the other of said axes, a vertical detector and a gyroscope mounted on said platform, said vertical detector providing a signal when the platform departs from the horizontal about each of said axes, means to discriminate the phase of each of the signals, means to provide a pulsating voltage to periodically interrupt said discriminating means, means responsive to the outputs of said discriminating means and exerting pulsed precessing torques on said gyroscope about said axes, means to reduce the pulse frequency when the craft turns to provide a slower precessing rate for the gyroscope, and a pick-off providing an integrated signal in response to relative movement of said platform and the spin axis of the gyroscope about each of said axes, an angular rate generator having its spin axis disposed parallel to one of said axes and being connected to said pick-off to receive the integrated signal from the pick-off corresponding to said other axis, and an angular rate generator having its spin axis disposed parallel to the last-mentioned axis and being connected to said pick-off to receive the integrated signal from the pick-off corresponding to said first-mentioned axis, said rate generators producing voltages out of phase with the integrated signals in response to rotation of the platform about said axes to damp movement of said platform, and said motors being responsive to the integrated signals and outputs of said rate generators.

8. In a vertical detector, a core having a plurality of pairs of pole pieces with the poles of each pair opposing one another, means to excite said pole pieces, an output coil on each of said opposing poles, the coils on opposing poles being connected so that voltages induced in the coils oppose one another, and an armature pendulously supported by a wire from a support fixed with relation to said core for movement relative to said core and substantially parallel to the plane of said core, the arrangement being such that the output of opposing coils of all pairs of pole pieces is determined by the relative positions of said member and core.

9. In a vertical detector, a core having a central pole and four mutually spaced poles with pairs of poles opposing one another, means to excite said mutually spaced poles, an output coil on each of said mutually spaced poles, the coils on opposing poles being connected so that voltages induced in the coils oppose one another, and a member pendulously supported by a wire for movement relative to said core toward each of said poles, the arrangement being such that the output of said coils is determined by the relative position of said member and core.

10. In a system for maintaining horizontal a platform mounted in a moving craft and rotatable relative to the craft about mutually perpendicular horizontal axes, a reversible motor for rotating said platform about one of said axes, a second reversible motor for rotating said platform about the other of said axes, a vertical detector and a gyroscope mounted on said platform, said vertical detector providing a signal when the platform departs from the horizontal about each of said axes, means to discriminate the phase of each of the signals, means to provide a pulsating voltage to periodically interrupt said discriminating means, means responsive to the outputs of said discriminating means, and exerting pulsed precessing torques on said gyroscope about said axes, a free gyroscope periodically caged and adapted to detect turning of the craft and reduce the pulse frequency when the craft turns to provide a slower precessing rate for the gyroscope, and a pick-off providing an integrated signal in response to relative movement of said platform and the spin axis of said gyroscope about each of said axes, and said motors being responsive to the outputs of said pick-off.

11. A vertical detector comprising a pendulous armature, a stator having windings thereon, and means including a wire supporting said armature from a support fixed with relation to said armature for movement relative to said support in more than one plane, arranged for producing in said windings signals corresponding to the relative displacement of said armature and stator from a predetermined position in at least two angularly related directions.

References Cited in the file of this patent

UNITED STATES PATENTS

| | | |
|---|---|---|
| 1,988,458 | Minorsky | Jan. 22, 1935 |
| 2,014,825 | Watson | Sept. 17, 1935 |
| 2,270,876 | Esval | Jan. 27, 1942 |
| 2,424,766 | Miner | July 29, 1947 |
| 2,478,956 | Webber | Aug. 16, 1949 |
| 2,492,244 | Shivers | Dec. 27, 1949 |
| 2,495,591 | Meredith | Jan. 24, 1950 |
| 2,515,969 | Shivers | July 18, 1950 |
| 2,517,612 | Varian | Aug. 8, 1950 |
| 2,533,217 | Braddon | Dec. 12, 1950 |
| 2,552,722 | King | May 15, 1951 |

FOREIGN PATENTS

| | | |
|---|---|---|
| 9,838 | Great Britain | of 1908 |